April 26, 1960 C. C. LAVAL, JR 2,933,810
HOSE AND CABLE CUTTING APPARATUS
Filed July 9, 1957 2 Sheets-Sheet 2

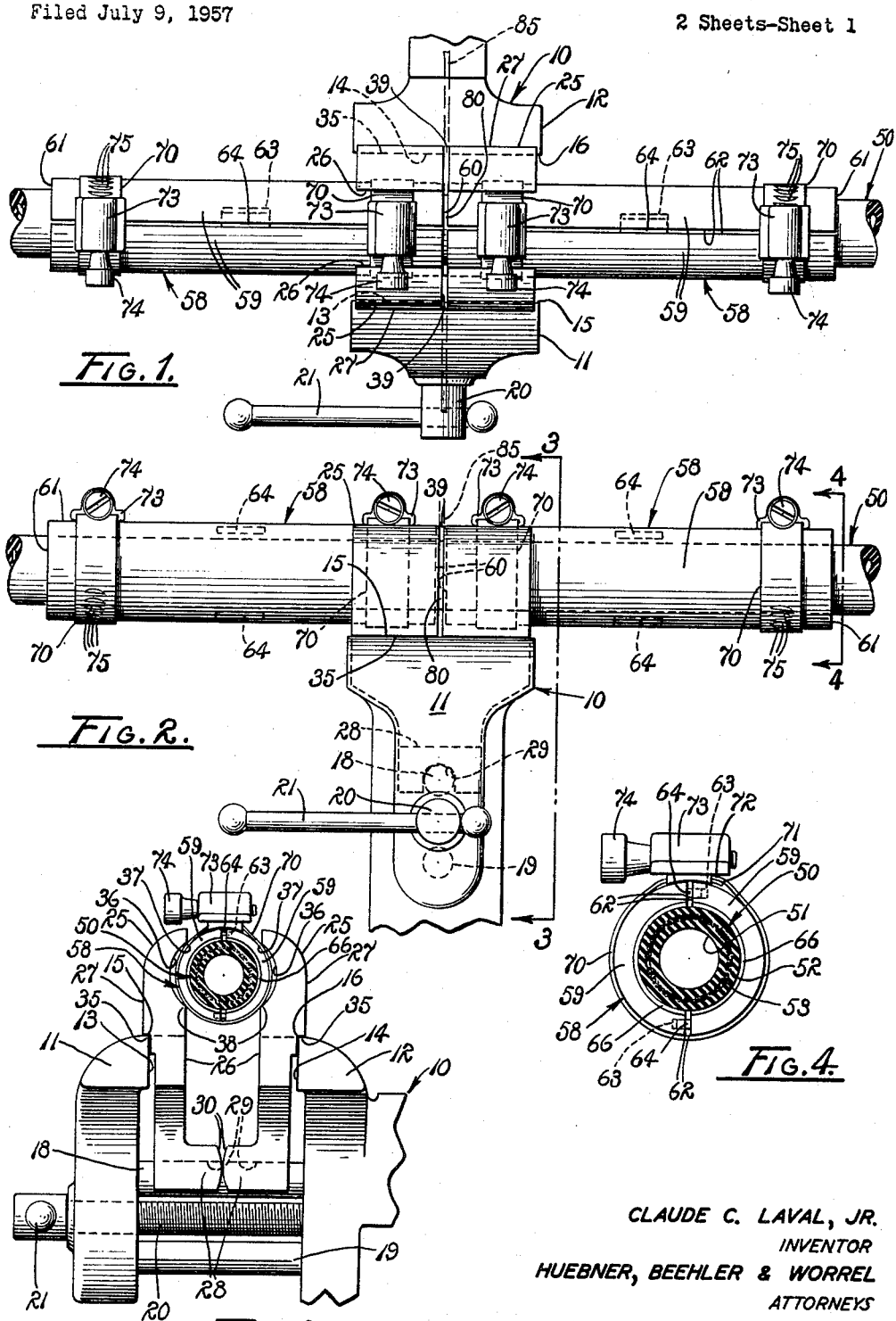

CLAUDE C. LAVAL, JR.
INVENTOR
HUEBNER, BEEHLER & WORREL
ATTORNEYS

United States Patent Office 2,933,810
Patented Apr. 26, 1960

2,933,810

HOSE AND CABLE CUTTING APPARATUS

Claude C. Laval, Jr., Fresno, Calif.

Application July 9, 1957, Serial No. 670,707

2 Claims. (Cl. 30—96)

The present invention relates to a clamping apparatus and more particularly to a device for holding elongated flexible hose, cable and the like in predetermined non-rotatable position to facilitate cutting of the hose in a plane transverse to the axis of the hose and providing such constricted confinement as to avoid or minimize fraying during the cutting operations.

Certain types of hose, particularly for hydraulic or pneumatic pressure use, are constructed with the concentric annular lamina or layer of wire braid embedded in rubber, plastic or other material of the hose. Quite obviously, the wire braid adds considerable strength and durability to the hose, increases its resiliency, decreases its longitudinal flexibility, and increases resistance to transverse compression. On the other hand the incorporation of this wire braid makes it extremely difficult to cut the hose along a plane transverse to the axis of the hose so as to leave the cut edges clean and smooth. This is a problem often encountered in shortening hose, providing hose with desired fittings, splicing hose and performing similar tasks on cable and the like employing braided wire.

In the past cutters have been available for this purpose but those which are effective have been relatively expensive, bulky, and somewhat complex. Further, they have not proved fully effective in avoiding fraying of the wires during cutting operations. Even so, such devices have been universally employed because it has been virtually impossible to cut such hoses and cables with conventional tools, such as hack saws, pipe cutters and the like.

Accordingly, it is an object of the present invention to provide a device for clamping elongated flexible hoses, cables and the like in a predetermined non-rotatable position to facilitate cutting in a plane transversely thereof.

Another object is to make possible the severing of hoses and cables so as to provide clean cut ends with a minimum of fraying.

Another object is to enable the effective use of conventional tools, such as hack saws, pipe cutters and the like to cut hoses and cables.

Another object is to enable use of the subject clamping device in conventional vises.

Another object is to provide a clamping apparatus which is adaptable for use with various sizes of hoses and cables.

These together with other objects will become more fully apparent upon reference to the following description and accompanying drawing.

In the drawing:

Fig. 1 is a top plan view of the clamping apparatus of the present invention held by a vise and holding a hose in predetermined non-rotatable position.

Fig. 2 is a side elevation of the structure shown in Fig. 1.

Fig. 3 is a transverse section taken on line 3—3 of Fig. 2.

Fig. 4 is a somewhat enlarged transverse section taken one line 4—4 of Fig. 2.

Figure 5:
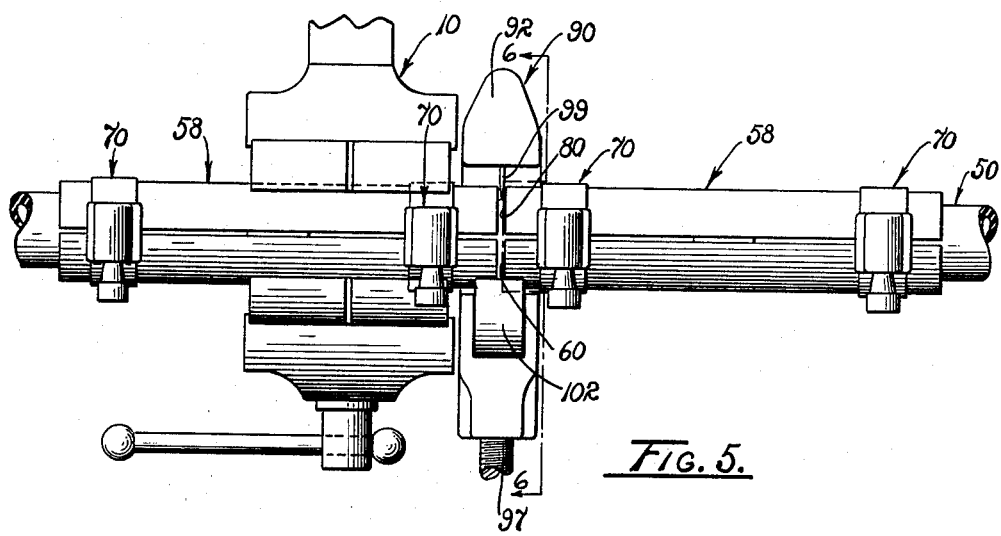
Fig. 5 is a top plan view of the clamping device of the present invention held in a vise in a different manner from Fig. 1 and including a modified form of cutting tool.
Figure 6:
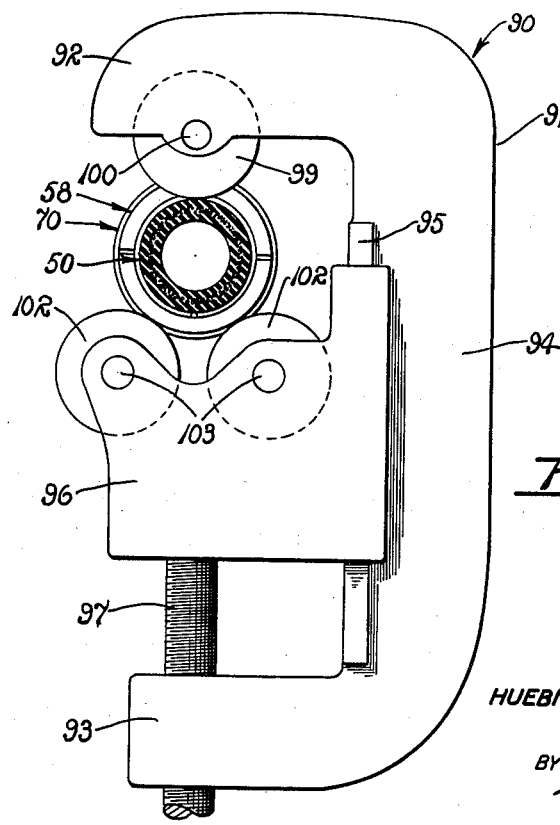
Fig. 6 is a somewhat enlarged, transverse section taken on line 6—6 in Fig. 5.

Referring more particularly to the drawing, a vise of conventional construction is indicated by the numeral 10 in Figs. 1, 2, and 3. The vise includes a pair of opposed jaws 11 and 12 having inwardly disposed faces 13 and 14 and upper elongated edges 15 and 16. Spaced parallel upper and lower guide rods 18 and 19 are rigidly secured to the face 13 of the jaw 11 and are longitudinally slidably received in bores, not shown, in the jaw 12. An elongated screw 20 is rotatably mounted in the jaw 12 and extended between the jaws in substantially parallel position between the upper and lower rods. Further, the screw is threaded through the jaw 11 and has an outer end to which is transversely slidably connected a handle bar 21 serving as a crank. As is well-known, rotation of the screw causes movement of the jaws toward and away from each other.

A clamping apparatus, as constructed in accordance with the subject invention, provides a pair of identical clamping member holders 25 which are adapted to be mounted on the vise 10. Each holder has a front face 26, a back face 27, and a lower shoe 28 forwardly extended from the front face. The shoe has an upwardly arched socket 29 releasably rested on and preferably complementarily fitted to the upper rod 18 of the vise, and a front convex abutment surface 30 adapted for rolling contact with the corresponding abutment surface of the other holder when the latter is also rested on the upper rod.

The holders 25 further provide elongated rear shoulders 35 rested on the upper edges 15 and 16 of their respective jaws 11 and 12. When the shoes 28 are fitted on the upper rod, the shoulders are adapted to rest on the upper edges. This is so the holders will remain in upright positions, as shown in Fig. 3, on the vise when the jaws 11 and 12 are open even farther than that shown in Fig. 3. The holders also have longitudinally extended fractionally cylindrical upper recesses 36 in opposed relation in the front faces 26. These recesses have elongated longitudinal upper and lower edges 37 and 38 respectively. Further, the holders provide slots 39 therein disposed transversely of the holders and lying in a substantially common plane, as best seen in Fig. 1, when the holders are fitted on the vise, as described. The slots terminate adjacent to the shoulders 35 between the upper and lower ends of the holders.

For convenience in describing the utility of the present invention, an elongated flexible hydraulic hose is indicated by the numeral 50 and provides an inner bore 51, an outer cylindrical surface 52, and an embedded lamina of wire braid 53.

A pair of clamping members 58 are provided each including a pair of fitted semi-cylindrical segments 59 having inner ends 60, outer ends 61, and longitudinal edges 62. The ends are merely referred to for descriptive convenience and are not to be regarded as limiting the positioning of the clamping members. It will be noted that the inner end of each segment lies in a plane precisely normal to the axis of the segment. The significant feature in this regard is that the ends are in adjacent spaced relation when their respective members are mounted for use and are substantially parallel so as to define a substantially uniform guideway therebetween. To make a beveled cut of a hose or cable, the ends may obviously lie in parallel planes oblique to the longitudinal axes of their respective members. Preferably, one of the segments of each pair is provided with a notch 63 in one of the edges thereof and a complementary tongue 64 extended from the other edge. Thus, the segments are fitted together in cylindrical relationship with the tongues received in the grooves so as to prevent relative longitudinal sliding of the segments.

The segments 59 are adapted to be fitted in circumscribing relation to the hose 50. In other words, the segments are fitted into their tubular or cylindrical relationship around the hose. In order to adapt the segments to various sizes of hose, semi-cylindrical shims 66 are removably fitted within the segments between the segments and the hose, as best seen in Fig. 4. The shims are selected in accordance with the size of the hose or cable to be clamped so as to assure a firm grasp.

When the segments 59 of each clamping member 58 are properly fitted on the hose 50, the tongues and grooves 64 and 63 are interfitted but the edges 62 are in spaced relation. Thus arranged, the segments are adapted to be constricted in tight engagement with the hose so as to prevent rotation of the hose relative to the clamping member. For this purpose a pair of annular constricting bands 70 are fitted in circumscribing relation around opposite ends 60 and 61 of each clamping member 58. The bands are arranged in longitudinally spaced relation along the clamping member. Each band provides a relatively fixed end 71 and an adjustable end 72 slidable on the fixed end. A bracket 73 is connected to the fixed end of the band, and an adjusting screw 74 is mounted in the bracket for screw-threaded travel along a line generally tangential to the band. The adjusting end provides a plurality of longitudinally spaced slits 75 which are engageable by the threads of the screw whereby threading of the screw constricts or loosens the band. These bands are conventionally sold as clamps under the trade-mark "Aero-Seal" of the Breeze Corp., Inc. of Union, New Jersey and simply illustrate a convenient constricting means for the segments of the clamping members. It is to be understood that many other means will readily suggest themselves to those skilled in the art for constricting the clamping members around the hose.

The clamping members 58 are fitted around and tightly clamped on the hose 50 by the constricting bands 70 with their inner ends 60 in closely adjacent spaced relation, as seen in Figs. 1 and 2. The inner ends of the clamping members thus define an annular cutting space or channel 80 of substantially uniform width about the hose. The spacing of said inner ends should be at a minimum permitted by the cutting tool employed.

*Operation*

The operation of the described embodiment of the subject invention is believed to be readily apparent and is briefly summarized at this point.

The screws 74 are loosened so as slightly to separate the segments 59 of the clamping member 58 and the clamping members are slid over opposite ends, or the same end, of the hose 50 to be cut. Alternatively, the clamping members may be separated and the segments assembled on the hose. The inner ends 60 are positioned to provide the cutting space 80, and the screws 74 are tightened to constrict the clamping members tightly around the hose. The inner bands 70 may be located within the holders 25 so as to be engaged thereby, as shown, or slid outside of the holders so the latter directly contact the clamping members 58 throughout.

The crank 21 is manipulated to rotate the screw 20 to open the jaws 11 and 12 of the vise 10. The holders 25 are then rested on the jaws in the manner described. The clamping members 58 clamping the hose 50 therein are positioned between the recesses 36 of the holders with the screws 74 preferably upwardly disposed and with the cutting space 80 in precisely the same plane as the slots 39. While holding the clamping members and hose in this position, the screw 20 is rotated to close the jaws 11 and 12. The abutment surfaces 30 move into contact and cause the upper edges 15 and 16 of the jaws to urge the upwardly disposed portions of the holders into tight clamping engagement with the clamping members 58. The upper and lower edges 37 and 38 of the recesses, of course, effect line contact with the clamping members. In this regard it is to be noted that the recesses should have a diameter smaller than the smallest clamping member diameter to be used so that there will always be at least the described line contact of the edges 37 and 38 and the clamping members.

After the clamping members 58 are secured in the vise 10 between the holders 25, the hose 50 is ready to be cut. A hacksaw 85 or other cutting tool, is inserted through the slots 39 and the cutting space 80 and rested on the hose exposed therebetween. Thereafter, the saw is moved back and forth in the ordinary manner to cut down through the hose. In actual use it is found that the edges of the hose cut by using the subject invention are extremely smooth and clean and are not frayed or separated. This is due to the fact that the hose is securely held against rotation by the clamping members in a precise position. Of course, the hose is also held in longitudinally fixed position. Further, the clamping members do not cut into or otherwise damage the exterior surface 52 of the hose.

Alternatively, the hose, cable, or other workpiece 50 may be held by placing only one of the holding members 58 in the vise 10, or other support, such as shown in Fig. 5. A pipe cutter 90 is provided having a substantially C-shaped mounting member 91 providing a pair of spaced arms 92 and 93 interconnected by a back portion 94 along which is provided an inwardly disposed track 95. A slide 96 provides a groove, not shown, fitted on the track to enable slidable movement of the slide between the arms. An elongated screw 97 has an end rigidly connected to the slide and an oppositely extended end screw-threadably mounted in the arm 93 to enable adjustment of the slide. A thin cutting blade 99 having a circular cutting edge is rotatably mounted on the arm 92 by means of a pin 100. It is to be noted that the blade extends inwardly of the mounting member toward the arm 93. Rollers 102 are likewise journaled on the slide 96 opposed to the blade on spaced pins 103 which are parallel to and in triangular relation with the pin 100.

The pipe cutter 90 is employed by extending the arms 92 and 93 on opposite sides of the holding members 58 and inserting the cutting blade 99 in the cutting space or channel 80. The thickness of the channel is such as to closely accommodate the blade and to preclude any appreciable axial movement of the blade relative to the workpiece 50. The screw 97 is backed off to permit the clamping members to be fitted between the blade and the rollers 102. The screw is then threaded inwardly of the mounting member to move the rollers toward the blade and into rolling engagement in overlapping relation with the adjacent ends 60 of the clamping members. In this position the rollers span the channel and mount the blade for circumscribing movement around the workpiece. The screw is tightened to penetrate the workpiece with the blade so that upon said circumscribing movement, the workpiece is severed along the plane defined by the channel.

Likewise each holding member 58 may be placed in a separate vise 10 similarly to leave the ends 60 of the members accessible for rolling engagement by the pipe cutter 90. In any event certain requirements must be met. First, the holding members must tightly and non-rotatably grasp the hose or cable so as dependably to compact and to constrain the woven or braided wires 53 into a firm unitary mass at the point of desired cut. Second, the ends 60 must be in closely adjacent spaced relation properly to avoid fraying. Actually they should be spaced no further than required to receive the cutting tool therebetween. Third, the cutting tool engages the ends 60 and by such engagement is dependably held in the desired cutting plane and precluded from jumping or otherwise deviating therefrom.

In order to achieve even smoother ends on the cut hose or cable, the ends may be brought to bear against the side of an emery wheel or the like before removal from the holding members and thus ground to a smooth surface.

From the foregoing it will be evident that a highly effective device for clamping and holding flexible hose in a predetermined non-rotatable position to facilitate transverse cutting of the hose has been provided. The device is of especial significance since it is relatively simple and inexpensive and enables an extremely smooth and clean cut. The device is adapted to various sizes of hose and is readily suited for quick on-the-job use.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. The combination of a device for clamping an elongated flexible hose, cable or similar workpiece having an elongated axis and an external cylindrical surface concentric to said axis in predetermined non-rotatable position to facilitate cutting the workpiece along a transverse plane normal to the axis of the workpiece, said device including a pair of elongated tubular clamping members in substantially circumscribing concentric relation to the workpiece and having inwardly disposed ends providing external substantially cylindrical surfaces concentric to the axis of the workpiece and opposed end edges in closely spaced relation to define an annular cutting space, each of the clamping members including a plurality of fractionally cylindrical segments having longitudinally extended edges in adjacent closely spaced relation when the clamping members are mounted on such a workpiece, and means connected to the clamping members for tightly constricting them about the workpiece to preclude rotatable or longitudinal movement of the workpiece relative to the clamping members; and a cutting tool including a substantially C-shaped mounting member having a pair of spaced arms on opposite sides of the clamping members interconnected by a back portion, a cutting blade mounted on one of the arms for rotation about an axis substantially parallel to the axis of the clamping members and being fitted in said cutting space in substantially parallel relation to said adjacent end edges, a slide mounted on the back portion for slidable movement toward and away from the blade, a pair of rollers mounted on the slide opposite to the blade for rotation about spaced axes substantially parallel to and in triangular relationship with the axis of the blade and for endwardly overlapping rolling engagement with the adjacent ends of the clamping members in spanning relation to the cutting space, and means interconnecting the slide and the arm opposite to the arm mounting the blade for moving the slide between a cutting position with the rollers engaging the clamping members and the blade engaging a workpiece held by the clamping members, and a position retracted therefrom, whereby in said clamping position, the rollers mount the blade for circumscribing movement around the workpiece to cut the workpiece in a pair of separable portions.

2. A hose and cable cutting device comprising a pair of sets of clamping members, the clamping members each being a longitudinally divided segment of a cylinder and the members of each set being assemblable into cylindrical arrangement about a hose or cable to be cut, means releasably engageable with the members adapted to constrict the members in cylindrical, non-rotatable, clamping arrangement about a hose or cable with the sets in axial adjacent relation providing parallel adjacent ends cooperatively forming a cutting tool guide channel circumscribing the hose or cable on which the sets are mounted and aligned cylindrical outer peripheral portions of the same diameter adjacent to said ends; and a cutter providing a pair of rotatable rollers and an opposed rotatable blade, the rollers each being in rolling engagement with both of said peripheral portions in overlying relation to the guide channel and the blade being extended into the guide channel in guided engagement with the adjacent ends of clamping members and in rolling cutting engagement with the hose or cable.

References Cited in the file of this patent

UNITED STATES PATENTS

| | | |
|---|---|---|
| 575,685 | Brockett | Jan. 26, 1897 |
| 1,166,505 | Wills | Jan. 4, 1916 |
| 1,205,125 | Dies | Nov. 14, 1916 |
| 1,968,857 | Shafer | Aug. 7, 1934 |
| 2,064,017 | Leschen | Dec. 15, 1936 |
| 2,571,916 | McKinley | Oct. 16, 1951 |
| 2,582,021 | Ernst | Jan. 8, 1952 |